United States Patent
Ramsey

(10) Patent No.: US 10,208,813 B2
(45) Date of Patent: Feb. 19, 2019

(54) ONE WAY WEDGE CLUTCH WITH DISPLACEABLE WEIGHT ELEMENT TO ELIMINATE LOCKUP IN FREE-WHEEL MODE

(71) Applicant: Schaeffler Technologies AG & Co. KG, Herzogenaurach (DE)

(72) Inventor: John Ramsey, Lucas, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 786 days.

(21) Appl. No.: 14/796,605

(22) Filed: Jul. 10, 2015

(65) Prior Publication Data

US 2016/0084326 A1    Mar. 24, 2016

Related U.S. Application Data

(60) Provisional application No. 62/052,840, filed on Sep. 19, 2014.

(51) Int. Cl.
    *F16D 15/00*    (2006.01)
    *F16D 43/14*    (2006.01)
    *F16D 41/063*    (2006.01)

(52) U.S. Cl.
    CPC ............ *F16D 41/063* (2013.01); *F16D 15/00* (2013.01); *F16D 43/14* (2013.01)

(58) Field of Classification Search
CPC ........ F16D 41/063; F16D 15/00; F16D 43/14; F16D 41/06; F16D 41/082; F16D 41/02; F16D 13/12–13/18
See application file for complete search history.

(56) References Cited

U.S. PATENT DOCUMENTS

| | | | | |
|---|---|---|---|---|
| 2,224,935 | A | * 12/1940 | Schultz | ................. F16D 41/063 |
| | | | | 192/105 BA |
| 3,107,764 | A | * 10/1963 | Fulton | .................... F16D 41/063 |
| | | | | 192/41 R |
| 2006/0021837 | A1 | 2/2006 | Kimes et al. | |
| 2008/0093189 | A1 | 4/2008 | Wiesneth et al. | |
| 2009/0159390 | A1 | 6/2009 | Davis | |
| 2014/0014454 | A1 | 1/2014 | Davis | |
| 2014/0231208 | A1* | 8/2014 | Lee | ......................... F16D 21/00 |
| | | | | 192/48.5 |

FOREIGN PATENT DOCUMENTS

JP            2006077921        3/2006
WO    WO-2016119786 A1 * 8/2016 ........... F16D 41/063

\* cited by examiner

*Primary Examiner* — Colby M Hansen

(57) ABSTRACT

A one-way clutch including: a wedge plate including a first radially innermost circumference with a first plurality of ramps; an inner race including a first radially outermost circumference with a second plurality of ramps and arranged to receive torque and transmit the torque to the wedge plate in a lock-mode for the one-way clutch; and a weighting element engaged with the wedge plate. The weighting element is arranged to displace, in response to rotation of the inner race, to radially contract the wedge plate.

20 Claims, 4 Drawing Sheets

ONE WAY WEDGE CLUTCH WITH DISPLACEABLE WEIGHT ELEMENT TO ELIMINATE LOCKUP IN FREE-WHEEL MODE

CROSS-REFERENCE TO RELATED APPLICATIONS

This application claims the benefit under 35 U.S.C. § 119(e) of U.S. Provisional Patent Application No. 62/052,840, filed Sep. 19, 2014, which application is incorporated herein by reference in its entirety.

TECHNICAL FIELD

The present disclosure relates to a one-way wedge clutch with a displaceable weight element to eliminate lockup in free-wheel mode, in particular, a multi-piece weight element arranged to radially contract a wedge plate while the clutch is in free-wheel mode.

BACKGROUND

A wedge one-way clutch including an inner race with a plurality of ramps and a wedge plate with a plurality of ramps engaged with the plurality of ramps for the inner race is known. In a free-wheel mode, the inner race and the wedge plate rotate together. If the inner race is the driven component of the clutch and the rotational speed of the inner race is high enough in the free-wheel mode, the rotation of the inner race and wedge plate produces a centrifugal force acting to expand the wedge plate radially outward. If the radially outward expansion is large enough, the outer circumference of the wedge plate can frictionally engage an outer race for the clutch, initiating an undesirable lock-up of the clutch (non-rotatable connection of the inner and outer race).

SUMMARY

According to aspects illustrated herein, there is provided a one-way clutch, including: a wedge plate including a first radially innermost circumference with a first plurality of ramps; an inner race including a first radially outermost circumference with a second plurality of ramps and arranged to receive torque and transmit the torque to the wedge plate in a lock-mode for the one-way clutch; and a weighting element engaged with the wedge plate. The weighting element is arranged to displace, in response to rotation of the inner race, to radially contract the wedge plate.

According to aspects illustrated herein, there is provided a one-way clutch, including: a wedge plate including a first radially innermost circumference with a first plurality of ramps and first and second pluralities of slots; an inner race including a first radially outermost circumference with a second plurality of ramps engaged with the first plurality of ramps and arranged to receive torque and transmit the torque to the wedge plate; a weighting element including first and second components and first and second pluralities of pins. The first and second pluralities of pins are fixed to the first and second components, respectively and disposed in the first and second pluralities of slots, respectively. For rotation of the inner race: the first and second components are arranged to displace away from each other; and to radially contract the wedge plate, the first component is arranged to displace to slide the first plurality of pins in the first plurality of slots and the second component is arranged to displace to slide the second plurality of pins in the second plurality of slots.

According to aspects illustrated herein, there is provided a one-way clutch, including: an outer race including a first radially inner circumference; and a wedge plate disposed radially inward of the outer races and including: a second radially innermost circumference with a first plurality of ramps; a first radially outermost circumference; first and second ends connecting the second radially innermost circumference and the first radially outermost circumference; and first and second pluralities of slots. The clutch includes: an inner race including a second radially outer circumference with a second plurality of ramps and arranged to receive torque and transmit the torque to the wedge plate; and a weighting element including a first component including a first plurality of pins fixed to the first component and disposed in the first plurality of slots and a second component including a second plurality of pins fixed to the second component and disposed in the second plurality of slots. For a free-wheel mode for the one-way clutch: the inner race is arranged to rotate in a circumferential direction; the first and second components are arranged to displace away from each other; the first and second pluralities of pins are arranged to slide in the first and second pluralities of slots, respectively, to urge the first and second ends toward each other to radially contract the wedge plate; and the inner race is rotatable with respect to the outer race.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
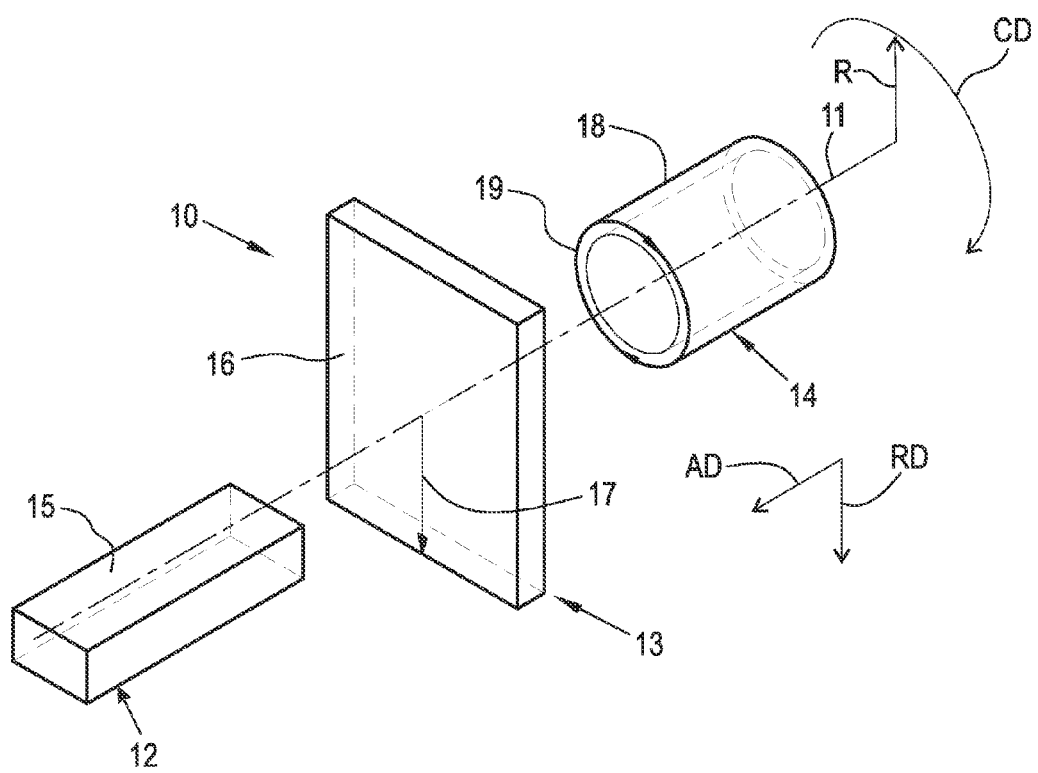
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
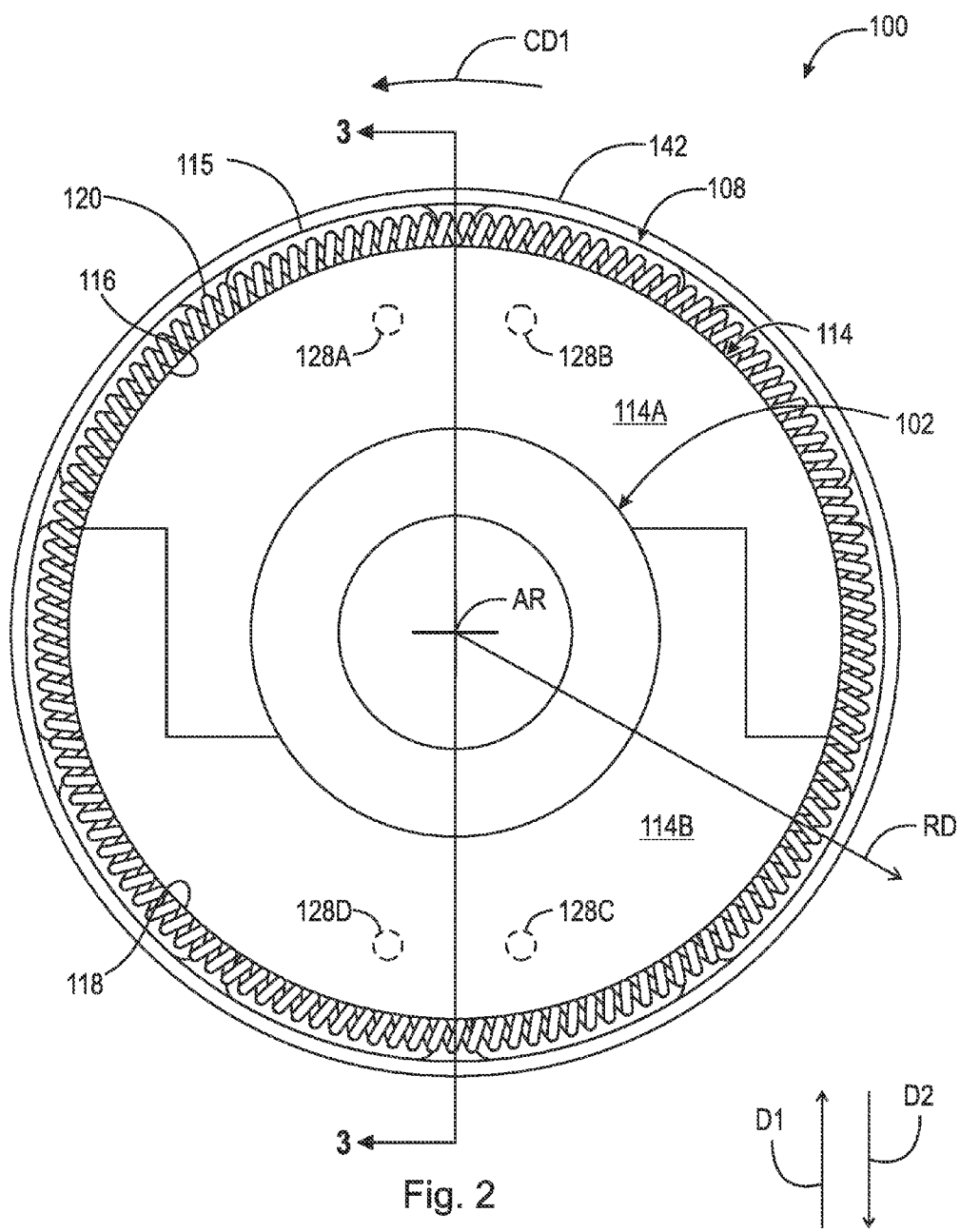
FIG. 2 is a front view of one-way wedge clutch with a displaceable weight element to eliminate lockup.

FIG. 2 is a front view of one-way wedge clutch 100 with a displaceable weight element to eliminate lockup.

Figure 3:
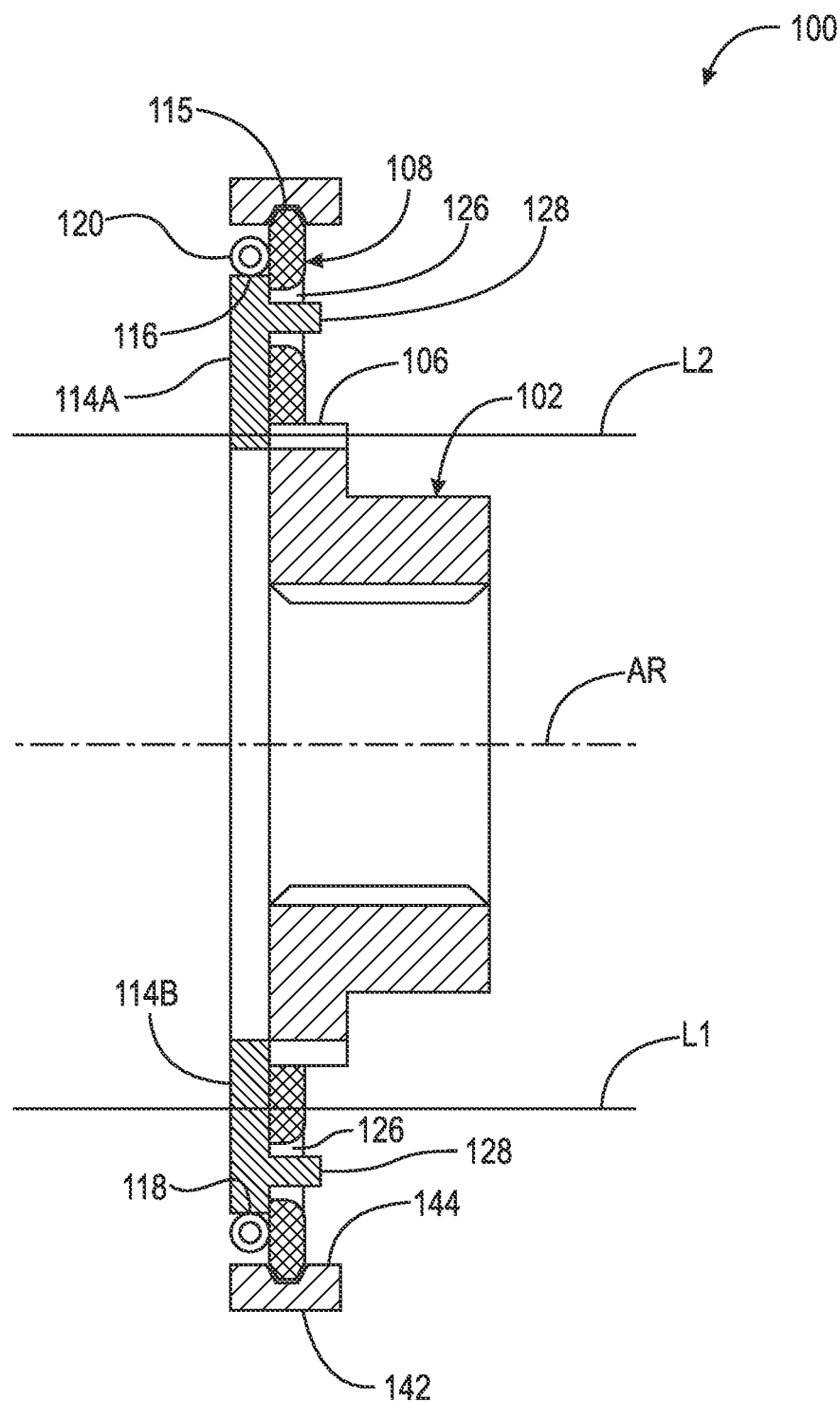
FIG. 3 is a cross-sectional view generally along line 3-3 in FIG. 2; and, FIG. 4 is a front view of the wedge plate shown in FIG. 2.

FIG. 3 is a cross-sectional view generally along line 3-3 in FIG. 2.

Figure 4:
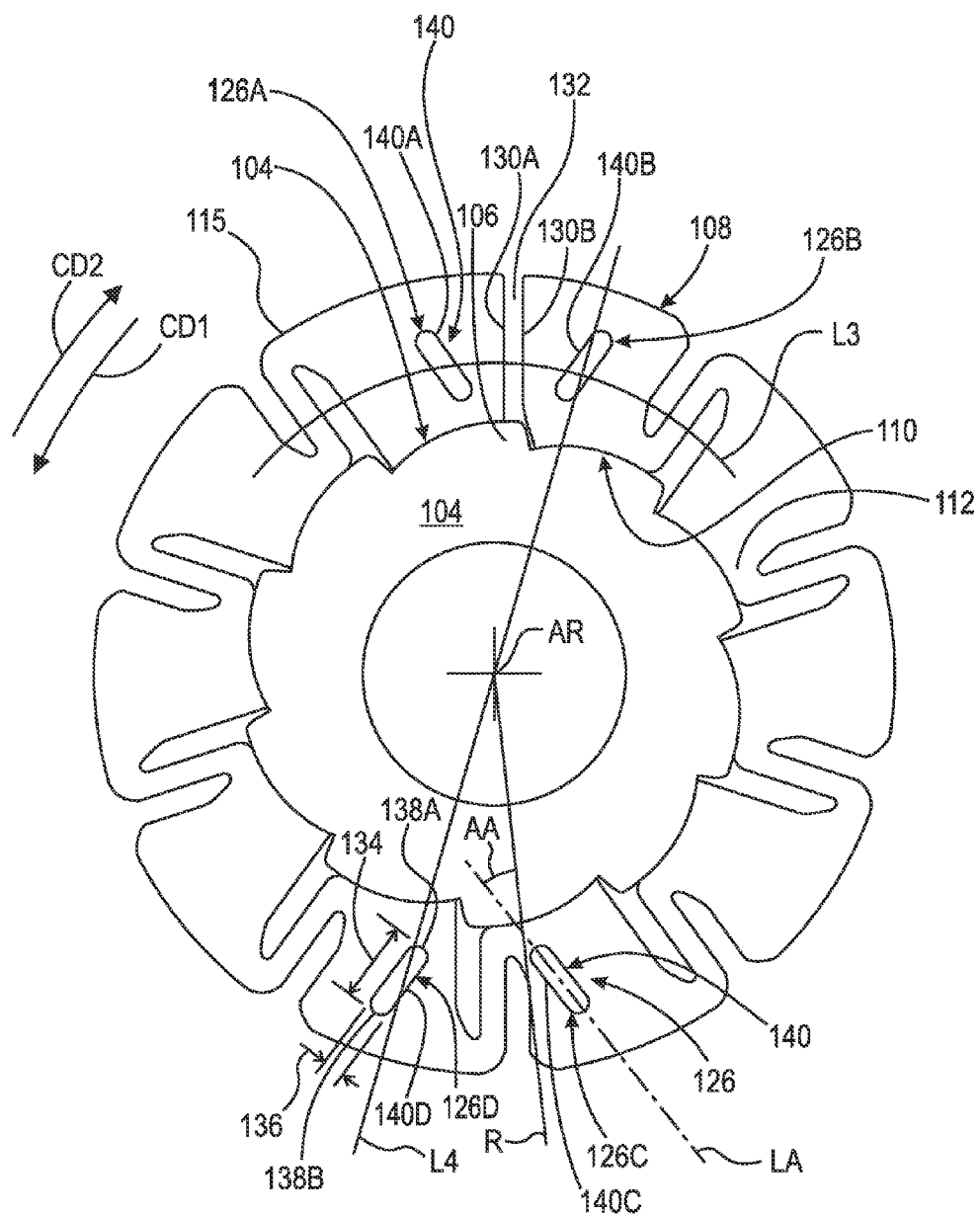

FIG. 4 is a front view of the wedge plate shown in FIG. 2. The following should be viewed in light of FIGS. 2 through 4. One-way clutch 100 includes: inner race 102 including radially outermost circumference 104 with ramps 106; wedge plate 108 including radially innermost circumference 110 with ramps 112; and weighting element 114 engaged with wedge plate 108. In an example embodiment, inner race 102 is the driven component for clutch 100, that is, inner race 102 is arranged to receive torque and transmit the torque to wedge plate 108. For rotation of inner race 102, weighting element 114 is arranged to displace to radially contract wedge plate 108. By "radially contract" we mean that at least a portion of radially outermost circumference 115 of wedge plate 108 is drawn closer to axis of rotation AR for clutch 100.

In an example embodiment, weighting element 114 includes components 114A and 114B arranged to displace in opposite directions D1 and D2, respectively, in response to rotation of inner race 102 in circumferential direction CD2 (free-wheel mode). That is, components 114A and 114B displace away from each other. Components 114A and 114B include radially outermost circumferences 116 and 118, respectively. Clutch 100 includes resilient element 120 engaged with circumferences 116 and 118 and urging components 114A and 114B in directions D2 and D1, respectively, that is, toward each other.

In an example embodiment, at least a portion of weighting element 114 is aligned with wedge plate 108 so that line L1 parallel to axis of rotation AR for clutch 100 passes through weighting element 114 and wedge plate 108 as shown in FIG. 3. In an example embodiment, at least a portion of weighting element 114 is aligned with inner race 102 so that line L2 parallel to axis of rotation AR passes through weighting element 114 and inner race 102 as shown in FIG. 3.

Circumference 115 extends further direction RD, orthogonal to axis of rotation AR, than circumferences 116 and 118.

In an example embodiment, wedge plate 108 includes slots 126 and weighting element 114 includes pins 128 fixed to the weighting element. Each pin 128 is disposed in a respective slot 126. In response to rotation of inner race 102 in direction CD2, pins 128 are arranged to displace in slots 126 to radially contract wedge plate 108. In an example embodiment, wedge plate 108 includes ends 130A and 130B separated from each other in circumferential direction CD2. At least respective portions of ends 130A and 130B are aligned with each other so that line L3 in direction CD2 passes through ends 130A and 130B and space 132, separating ends 130A and 130B.

Pins 128 are arranged to displace in slots 126 to urge ends 130A and 130B toward each other. Specifically, pins 128 are arranged to displace in slots 126 to urge end 130A in direction CD2 and to urge end 130B in circumferential direction CD1, opposite direction CD2. As ends 130A and 130B are drawn toward each other, at least a portion of circumference 115 is drawn closer to axis AR.

Each slot 126 includes a respective longitudinal axis LA. Extent 134 of each slot 126, parallel to longitudinal axis LA, is greater than extent 136 of slot 126 orthogonal to longitudinal axis LA. Each longitudinal axis LA is at acute angle AA with respect to line R orthogonal to axis of rotation AR for clutch 100.

In an example embodiment, slots 126 includes slots 126A-D. Each respective axis LA passes through respective ends 138A and 138B of each slot. Ends 138A are closer to axis AR than are ends 138B. Ends 138A for slots 126A and 126B are closer together in direction CD1 than are ends 138B for slots 126A and 126B. In like manner, ends 138A for slots 126C and 126D are closer together in direction CD1 than are ends 138B for slots 126C and 126D. In an example embodiment, slots 126 are symmetrically placed in wedge plate 108. For example, line L4 passes through axis of rotation AR and slots 126A and 126D.

In an example embodiment, pins 128A and 128B are fixed to component 114A and disposed in slots 126A and 126B. Pins 128C and 128D are fixed to component 114B and disposed in slots 126C and 126D. Each slot 126 includes a respective edge 140, for example, parallel to axis LA. In response to rotation of inner race 102 in direction CD2, pins 128A and 128B are arranged to contact edges 140A and 140B, respectively, and pins 128C and 128D are arranged to contact edges 140C and 140D, respectively. Radially outward displacement of components 114A and 114B and contact between pins 128 and edges 140 causes the circumferential displacement of wedge plate 108, for example, of ends 130A and 130B, and concurrent radial contraction of wedge plate 108.

Clutch 100 includes outer race 142 located radially outward of wedge plate 108 and including radially innermost circumference 144. For a free-wheel mode for one-way clutch 100, in which inner race 102 is rotatable with respect to outer race 142, inner race 102 rotates in circumferential direction CD2 with respect to outer race 142 and ramps 112 are arranged to slide down ramps 106. As is known in the art, as ramps 112 slide down ramps 106, wedge plate 108, in particular at least a portion of radially outermost circumference 115, constricts radially inward to prevent frictional engagement of radially outermost circumference 115 and radially innermost circumference 144 with sufficient force to trigger the lock-up mode of clutch 100. As noted above, in free-wheel mode, displacement of element 114 causes radial contraction of wedge plate 108.

For the lock-up mode for one-way clutch 100, in which wedge plate 108 is non-rotatably connected to inner race 102 and outer race 142, inner race 102 rotates in circumferential direction CD1 with respect to outer race 142 and ramps 112 are arranged to slide up ramps 106. As is known in the art, as ramps 112 slide up ramps 106, wedge plate 108, in particular radially outermost circumference 115, expands radially outward to frictionally engage radially outermost circumference 115 and radially innermost circumference 144 with sufficient force to trigger the lock-up mode of clutch 100. Note that the configuration of element 114 and slots 126 is such that the displacement of element 114 does not interfere with implementation of the lock-up mode. During lock-up mode, element 120 urges elements 114A and 114B into contact with each other to prevent rattling of elements 114A and 114B.

It should be understood that increasing a speed of rotation of inner race 102 in direction CD2 causes further displacement of component 114A and 114B in directions D1 and D2, respectively. It also should be understood that decreasing a speed of rotation of inner race 102 causes displacement of component 114A and 114B in directions D2 and D1, respectively, enabling ends 130A and 130B to displace away from each other.

Advantageously, weighting element 114 prevents the undesirable lock-up during free-wheel mode described above. As noted above, the lock-up is caused by centrifugal force displacing a radially outermost circumference, such as radially outermost circumference 115, radially outward far enough to frictionally engage an outer race with sufficient force to trigger a lock-up. For example, cause ramps on a wedge plate to slide up ramps on an inner race. Using the configuration shown in the figures as an example, as inner race 102 and wedge plate 108 rotate, the centrifugal force noted above causes components 114A and 114B to displace away from each other in directions D1 and D2, respectively. Because slots 126 are angled, in particular because slots 126A and 126B and slots 126C and 126D, respectively, taper toward each other in a radially inward direction, as pins 128 contact edges and displace in directions D1 and D2, respectively, ends 130A and 130B are forced together to accommodate the motion of pins 128 along edges 140. Pushing ends 130A and 130B toward each other radially contracts wedge plate 108, in particular, at least a portion of radially outermost circumference 115 is drawn closer to axis AR, preventing the undesirable engagement of wedge plate 108 and outer race 142.

Wedge plate 108 is flexible in circumferential directions CD1 and CD2, while components 114A and 114B are displaceable only in directions D1 and D2. Therefore, the flexibility of wedge plate 108 and the displacement of ends 130A and 130B are able to accommodate the displacement of components 114A and 114B in directions D1 and D2, respectively.

In an example embodiment (not shown), wedge plate 108 is circumferentially continuous. In this case, circumferential and radial contraction and expansion of wedge plate 108 is enable by radial slots, such as slots 126.

It should be understood that clutch 100 is not limited to the configuration shown in the figures. For example, the circumferential orientation of ramps 106 and 112 can be reversed.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A one-way clutch, comprising:
a wedge plate including a first radially innermost circumference with a first plurality of ramps;
an inner race including a first radially outermost circumference with a second plurality of ramps and arranged to:
receive torque; and,
transmit the torque to the wedge plate in a lock-mode for the one-way clutch; and,
a weighting element engaged with the wedge plate, wherein the weighting element is arranged to displace, in response to rotation of the inner race, to radially contract the wedge plate.
2. The one-way clutch of claim 1, wherein:
the weighting element includes first and second components arranged to displace in first and second opposite directions, respectively, in response to the rotation of the inner race.
3. The one-way clutch of claim 2, wherein the first and second components include respective radially outermost circumferences, the one-way clutch further comprising:
a resilient element engaged with the respective radially outermost circumferences and urging the first and second components in the second and first opposite directions, respectively.
4. The one-way clutch of claim 1, wherein at least a portion of the weighting element is aligned with the wedge plate so that a line parallel to an axis of rotation for the one-way clutch passes through the weighting element and the wedge plate.
5. The one-way clutch of claim 1, wherein at least a portion of the weighting element is aligned with the inner race so that a line parallel to an axis of rotation for the one-way clutch passes through the weighting element and the inner race.
6. The one-way clutch of claim 1, wherein:
the wedge plate includes a second radially outermost circumference;
the weighting element includes a third radially outermost circumference; and,
the second radially outermost circumference extends further, in a direction orthogonal to an axis of rotation for the one-way clutch, than the third radially outermost circumference.
7. The one-way clutch of claim 1, wherein:
the wedge plate includes a plurality of slots;
the weighting element includes a plurality of pins fixed to the weighting element;
each pin in the plurality of pins is disposed in a respective slot included in the plurality of slots; and,
in response to the rotation of the inner race, the plurality of pins are arranged to displace in the plurality of slots to radially contract the wedge plate.
8. The one-way clutch of claim 7, wherein:
the wedge plate includes first and second ends separated from each other in a first circumferential direction;
at least respective portions of the first and second ends are aligned with each other so that a line in the first circumferential direction passes through the first and second ends and a space separating the first and second ends; and, the plurality of pins is arranged to displace in the plurality of slots to urge the first and second ends toward each other.

9. The one-way clutch of claim 7, wherein:

each respective slot includes a respective longitudinal axis;

an extent of said each slot, parallel to the respective longitudinal axis, is greater than an extent of said each slot orthogonal to the respective longitudinal axis; and, the respective longitudinal axis is at an acute angle with respect to a line orthogonal to an axis of rotation for the one-way clutch.

10. The one-way clutch of claim 9, wherein:

the plurality of slots includes first, second, third, and fourth slots;

the respective longitudinal axis passes through respective first and second longitudinal ends for said each respective slot;

the respective first longitudinal ends are closer to the axis of rotation than the respective second longitudinal ends;

the respective first longitudinal ends of the first and second slots are closer together in a first circumferential direction than the respective second longitudinal ends of the first and second slots; and, the respective first longitudinal ends of the third and fourth slots are closer together in the first circumferential direction than the respective second longitudinal ends of the third and fourth slots.

11. The one-way clutch of claim 10, wherein:

a first line passes through the axis of rotation and the first and third slots; and, a second line passes through the axis of rotation and the second and fourth slots.

12. The one-way clutch of claim 10, wherein:

the weighting element includes first and second components displaceable with respect to each other;

the plurality of pins includes first and second pins fixed to the first component and disposed in the first and second slots; and, the plurality of pins includes third and fourth pins fixed to the second component and disposed in the third and fourth slots.

13. The one-way clutch of claim 12, wherein:

the wedge plate includes first and second ends separated from each other in the first circumferential direction;

the first slot includes a first edge, parallel to the respective longitudinal axis for the first slot;

the second slot includes a second edge, parallel to the respective longitudinal axis for the second slot; and, in response to rotation of the inner race in the first circumferential direction the first and second pins are arranged to contact the first and second edges, respectively.

14. The one-way clutch of claim 1, further comprising:

an outer race located radially outward of the wedge plate and including a second radially innermost circumference, wherein:

the wedge plate includes a second radially outermost circumference; and, for a free-wheel mode for the one-way clutch:

the inner race rotates in a first circumferential direction with respect to the outer race; and, the first plurality of ramps is arranged to slide down the second plurality of ramps; and, the inner race is rotatable with respect to the outer race.

15. The one-way clutch of claim 14, wherein for a lock-up mode for the one-way clutch:

the inner race rotates in a second circumferential direction, opposite the first circumferential direction, with respect to the outer race; the first plurality of ramps is arranged to slide up the second plurality of ramps;

the second radially outermost circumference is arranged to expand radially outward; and, the wedge plate is arranged to non-rotatably engage the inner race and the outer race.

16. A one-way clutch, comprising:

a wedge plate including: a first radially innermost circumference with a first plurality of ramps; and, first and second pluralities of slots;

an inner race including a first radially outermost circumference with a second plurality of ramps engaged with the first plurality of ramps and arranged to:

receive torque; and, transmit the torque to the wedge plate;

a weighting element including:

first and second components; and, first and second pluralities of pins:

fixed to the first and second components, respectively; and, disposed in the first and second pluralities of slots, respectively, wherein:

for rotation of the inner race:

the first and second components are arranged to displace away from each other; and, to radially contract the wedge plate:

the first component is arranged to displace to slide the first plurality of pins in the first plurality of slots; and, the second component is arranged to displace to slide the second plurality of pins in the second plurality of slots.

17. The one-way clutch of claim 16, wherein:

the wedge plate includes first and second ends separated from each other in a first circumferential direction; and, the first component is arranged to displace to slide the first plurality of pins in the first plurality of slots and the second component is arranged to displace to slide the second plurality of pins in the second plurality of slots to urge the first and second ends toward each other.

18. The one-way clutch of claim 16, further comprising:

an outer race located radially outward of the wedge plate and including a second radially innermost circumference, wherein:

the wedge plate includes a second radially outermost circumference; and, for a free-wheel mode for the one-way clutch: the inner race rotates in a first circumferential direction with respect to the outer race:

the first plurality of ramps is arranged to slide down the second plurality of ramps; and, the inner race is rotatable with respect to the outer race.

19. The one-way clutch of claim 18, wherein for a lock-up mode for the one-way clutch:

the inner race rotates in a second circumferential direction, opposite the first circumferential direction, with respect to the outer race; the first plurality of ramps is arranged to slide up the second plurality of ramps;

the second radially outermost circumference is arranged to expand radially outward; and, the wedge plate is arranged to non-rotatably engage the inner race and the outer race.

20. A one-way clutch, comprising:

an outer race including a first radially inner circumference;

a wedge plate disposed radially inward of the outer race and including:
- a second radially innermost circumference with a first plurality of ramps;
- a first radially outermost circumference; first and second ends connecting the second radially innermost circumference and the first radially outermost circumference; and,
- first and second pluralities of slots;

an inner race including a second radially outer circumference with a second plurality of ramps and arranged to:
- receive torque; and,
- transmit the torque to the wedge plate; and, a weighting element including:
- a first component including a first plurality of pins fixed to the first component and disposed in the first plurality of slots; and,
- a second component including a second plurality of pins fixed to the second component and disposed in the second plurality of slots, wherein for a free-wheel mode for the one-way clutch:

the inner race is arranged to rotate in a circumferential direction;

the first and second components are arranged to displace away from each other; the first and second pluralities of pins are arranged to slide in the first and second pluralities of slots, respectively, to urge the first and second ends toward each other to radially contract the wedge plate; and, the inner race is rotatable with respect to the outer race.

* * * * *